Nov. 11, 1958  H. E. RENAUD  2,859,530
SURFACE PLATE
Filed May 12, 1954
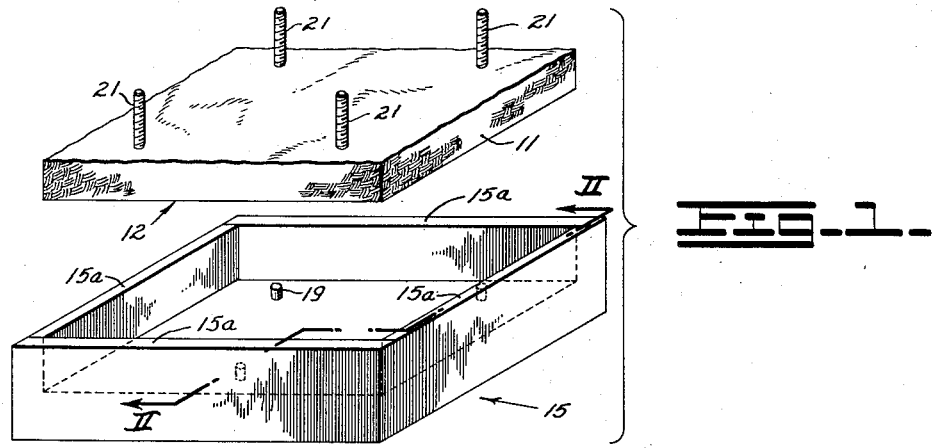
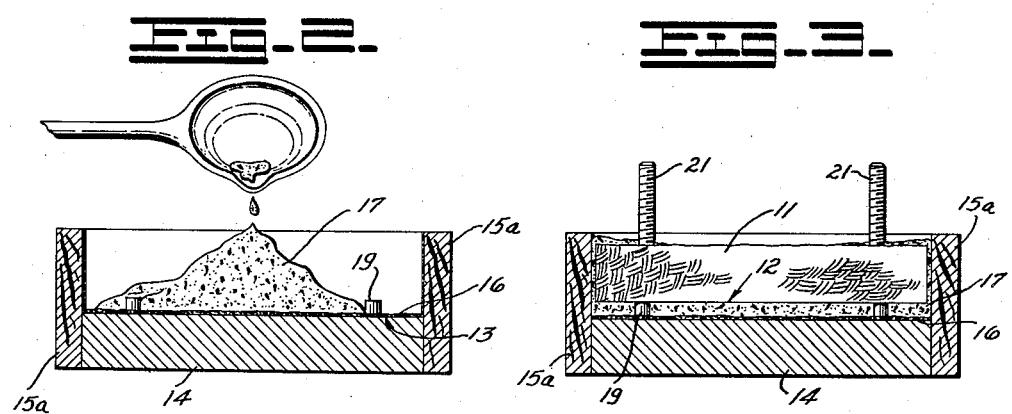
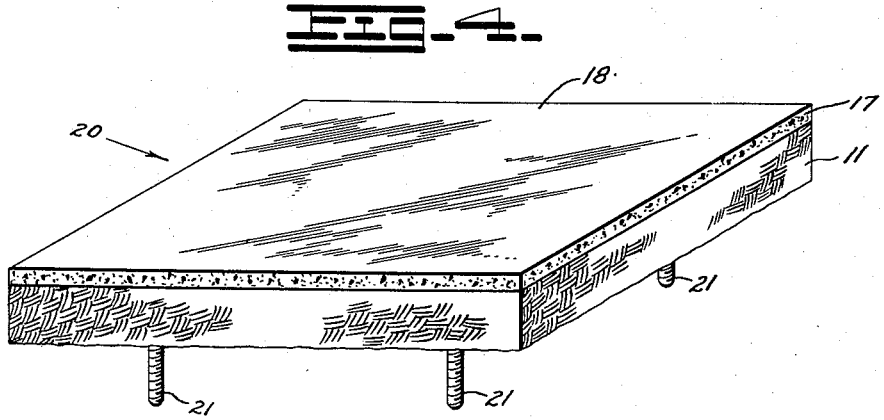
INVENTOR
Harold E. Renaud
BY
Laurence Vanderkelen & Miller
ATTORNEYS

United States Patent Office

2,859,530
Patented Nov. 11, 1958

2,859,530

SURFACE PLATE

Harold E. Renaud, Lansing, Mich., assignor to Ren-Ite Plastics, Inc., Lansing, Mich., a corporation of Michigan Application May 12, 1954, Serial No. 429,147

6 Claims. (Cl. 33—174)

The present invention relates to granite based surface plates and to a method for producing them. More particularly the invention is directed to resin faced surface plates and to the production of surface plates wherein a resin face is superimposed upon a granite block by means of an integral surface bond.

In surface plates the surface accuracy determines the lay-out accuracy of finished sheet metal or sheet plastic forms. The surface becomes the base for coordinating dimensional tolerances. The accuracy of the surface plate is, in turn, dependent upon the material constituting its base or support. Metal backing, cellular backing, and truss type support structures are known in the art as support material. The accuracy of the surface reproduced thereon is a constant compromise between thermal coefficients of expansion in the selected supporting materials and the ability of engineers in calculating a structure which will equally distribute expansion and contraction effects to minimize disturbance and distortion of the surface they support.

A surface plate is known in the tool and die art as a plate or surface from which dies, patterns, tools, and other structures can be layed out accurately. Surface plates have been made from various materials selected for their dimensional stability qualities, steel having been used extensively. Granite has also been employed for surface plates of extreme accuracy, but the high cost of finishing a granite surface plate has resulted in a demand for cheaper constructed plates in which the surface accuracy compares favorably with prior surface plates and in which surface wear is minimized. The refinishing or resurfacing of conventional steel or granite surface plates was expensive and collaterally a surface was sought which would adapt itself to simple renewal. Some advantage exists in the granite surface plate over the steel or other metal plates by reason of its relatively low coefficient of linear and cubic expansion. But granite is subject to the severe criticism of unequal abrasion by reason of the non-homogeneous character of its principal ingredients of feldspar, quartz, and mica. Further, granite is brittle in comparison to steel and shock loading causes chipping and scoring. The physical characteristics of the granite, however, makes it ideal as a dimensionally stable backing material for a surface plate and the present invention is addressed to a surface plate, which in abrasion resistance and dimensional stability surpasses both steel and granite, which surface plate has an extended useful life thereby, and when finally rendered unsuitable for extremely accurate work through prolonged usage can be refaced or resurfaced at a minimum of expense.

It is one of the purposes of the present invention to reduce the magnitude of the expansion and contraction problem and to remove the time-consuming calculations required in designing support structures which will minimize deformation stresses in normal winter and summer thermal ranges.

It is another object of this invention to teach a simple method for the utilization of shrink free granite based surface plates by the application of a resin face so as to take advantage of the low thermal coefficients of expansion inherent in granite material while at the same time minimizing the excessive cost required to reproduce a satisfactorily accurate surface directly upon the granite.

Still another object of this invention is to provide abrasion resistant and dimensionally stable resin materials capable of forming an integral adhesive bond to granite surfaces while making the granite support blocks available for reuse with little or no alteration in their surfaces.

Other advantages and objects of granite based surface plates provided with resin faces will become readily apparent to those skilled in the art of reproducing surfaces and surface plates as the description proceeds.

In the drawings:

Figure 1 is a perspective view of a rectangular granite block poised over a form built up around a master surface plate.

Figure 2 is a cross-section through Fig. 1 taken on line II—II of the master surface plate walled in by forms rising vertically along the sides of the block and showing the parting agent and the pour of resin.

Figure 3 is a cross-section view taken as in Fig. 2 showing the granite block lowered into position in the form and squeezing resin up between block and form.

Figure 4 is a perspective view of a finished smooth surface plate having a resin face and a granite base after curing and removal from the forms.

GENERAL DESCRIPTION

In general a granite block 11, selected for its low thermal coefficients of expansion, general rigidity and overall resistance to deformation, is conformed upon one of its surfaces 12 to a surface 13 which is sought to be reproduced thereon. Normally the surface plates 14 are flat upon the top and may be striated or unstriated depending upon the use to which they will be put. For illustrative purposes a plane surface is shown.

A form 15 is prepared to wall in the master surface plate 14. A coating of parting agent 16 is applied to the surface 13 of the master surface plate 14 and is applied also to the walls 15a comprising a portion of the form 15. A centrally located heap of resin material 17 is poured into the middle of the master surface plate 14 and over the parting agent 16. The surface 12 of the garnite block 11 is lowered downwardly upon the heap of resin material 17 and the pressure of the block 11 forces the equal distribution of the resin against the surface to be transferred 13 and a faithful reproduction of that surface 13 is made which upon curing and removal of the form 15 and master plate 14 becomes the surface 18 upon the granite base 11, as shown in Fig. 4. The thickness of the resin 17 is established by the thickness of spacers 19 of resin material 17 and cast into the resin mass 17. Thus, a substantially shrink-free natural backing material, granite, is provided with a bonded resin face 18 to provide an unusually satisfactory surface plate.

SPECIFIC DESCRIPTION

A granite block 11 is squared and leveled to the size desired as illustrated in Fig. 1 by well known granite working techniques. A form 15 is prepared to circumscribe or encase the edges of a master surface plate 13 and the walls 15a of the form 15 extend above the uppermost surface 13 of the master plate 14. The amount of extension depends largely upon the desired thickness of the finished face of the surface plate 18. A coating of parting agent 16 is applied uniformly to the upper surface 13 of the master plate 14. The coating of parting agent 16 is also lapped to cover any gaps or crevices between the form walls 15a and the master plate 14. In similar manner a coating of parting agent 16 is applied to the inner surface of the walls 15a of the form 15. In general a wax is used as the parting agent 16, although the application of a coat of polished wax, then a coat of white lacquer, and finally a finishing coat of wax provides a more durable system when applied as the parting agent 16.

A plurality of spacers 19 are positioned upon the master surface plate 14 preferably in a triangular pattern. The spacers 19 are of equal thickness, for example, about ⅛ inch, and the thickness of the spacers 19 determine the ultimate thickness of the facing ultimately to become the finished surface 18 of the surface plate. The spacers 19 are fashioned preferably from resinous material 17 having the same physical and chemical characteristics as the resin material 17. The practice, to prevent displacement of the spacers 19, is to dip the spacers 19 in the resin material 17 prior to positioning them upon the parting agent covered surface 13 of the master plate 14.

Resin material 17 is poured into a central heap on the top of the prepared master plate 14. The granite block 11, having upon its lower portion the desired surface 12 for finishing is lowered downwardly within the confines of the form walls 15a so as to force the resin material 17 into intimate engagement with the block surface 12. The necessary excess resin material 17 flows upwardly between the granite block 11 and the form walls 15a. The granite block 11 is left resting upon the spacers 19 with the evenly spread resin coat 17 for approximately 24 hours. Removal of the granite block 11 is facilitated by the parting agent 16 applied to the face 13 of the master plate 14. The form 15 is removed and the finished resin faced granite based surface plate 20 is complete upon removal of excess parting agent by solvent, e. g., butyl acetate. A smooth faced surface plate has resulted but a striated, lined, or grooved surface plate can be prepared quite as simply by altering the master plate 14 if desired. A surface plate in accordance with this specification compares favorably under usage with conventional metal surface plates and is more dimensionally stable both by reason of the resins comprising the face and the rigid, non-metallic and inorganic material comprising the base. The bond achieved between resin and granite is of exceptional integrity and the accuracy of the faces of such surface plates can be simply duplicated by these procedures thereby minimizing the cost of normally very expensive surface plates. Surface accuracy measured by steel straight edges and feeler gauges have been checked at .0015 inch with no alteration in procedures. This accuracy surpasses the normal accuracy in steel or metal surface plates. The dimensional stability of the surface, by reason of the facing material and by reason of the shrink free granite back produces a surface plate having greater thermal stability than metals in normal temperature variations and having abrasion resistance characteristics on the face surpassing the abrasion resistance in hitherto known surface plates.

The clearance selected between the size of granite block 11 and the internal dimensions of the form 15 is such as to permit easy flow of resin material 17 up around the sides of the granite block 11 so that the resin 17 actually flows over the back side of the block 11. Clearances of between about ⅟₁₆ and ½ inch or more have been satisfactorily employed. In this manner the inherent character of the resin used avoids the trapping of air bubbles which might otherwise pit the surface of the finished plate 20 or diminish the strength of the finished plate 20.

As indicated in Figs. 1, 3 and 4, the granite block is fitted with studs 21 for ease of handling.

In order to make possible a resin faced granite backed surface plate capable of rugged durability in usage, faithful accuracy independent of normal temperature ranges, and possessing excellent integrity of resin bond to granite, it has been necessary to specially formulate a resin material possessing all of these qualities desired upon curing. The following example indicates the preferred composition of the resins making possible resin faced granite based surface plates.

*Example 1.—Resin facing composition*

Composition A.—200 parts by weight of an epoxy resin, e. g., a condensation product under alkaline conditions of a chlorohydrin and a polyol phenol, more specifically a condensation product of epichlorohydrin and bis-phenol A, (Bakelite No. 18795), 80 parts by weight of lithopone (Permolith), 280 parts by weight of silicon carbide (No. 500—Macklin products), 4 parts by weight of a silica aerogel (Santocel C—Monsanto), and 2 parts by weight of blue colorant (Monastral blue) were admixed in a standard resin kettle until a homogeneous admixture was obtained. Fifty parts by weight of a polyfunctional amine hardener (Bakelite No. 18793), having available active hydrogens to form a reaction product with the epoxy-bis-phenol adjunct, was added to the above admixture and the resulting composition stirred until a uniform resin system was achieved.

Composition B.—100 parts by weight of the epoxy resin used in (A), 20 parts by weight of lithopone (Permolith), 60 parts by weight of silicon carbide (500 mesh), and one part of blue colorant were admixed and stirred in a standard resin kettle until a smooth admixture was obtained. Twenty-five parts by weight of the polyfunctional amine hardener of (A) was added and the resulting compositon stirred for 1½ minutes.

Immediately prior to suspension of the contoured granite block in the mold containing the master surface plate, compositions (A) and (B) were admixed and stirred thoroughly until complete homogeneity was obtained. Compositon (A) by itself exhibited a somewhat more viscous or thixotropic character than (B) with the resulting composite admixture being sufficiently fluid in nature so that the casting operation was accomplished without entrapment of air bubbles or pockets. Upon casting of the granite block in the mold and curing of the resin at room temperature or slightly elevated temperature, a resin faced granite surface plate having unusual properties was produced.

Alternatively, the composite admixture can be prepared directly in a single mixing operation by utilizing the combined weights of materials from compositions (A) and (B).

While the epoxy resin illustrated in Example 1 is the preferred basic resin, other resins exhibiting similar qualities, such as polyester and polyamide modified polyester and epoxy resins, may be employed. These types of resins possess relatively high heat distortion points, good impact resistance and show excellent dimensional stability under prolonged aging conditions. Under extreme variances in both thermal and moisture conditions, the dimensional deformation is extremely small which, when taken together with the excellent dimensional stability qualities of the granite base, provide a very superior surface plate that has far greater applicability for extremely accurate lay-out work than the conventional metal or metal faced surfaced plates heretofore employed in tooling applications.

Between about three and six parts by weight of epoxy resin, for example, and about one part of hardener (cross-linking agent) is preferably employed, generally permitting achievement of a desired effective epoxy to active hydrogen group ratio of about 1.0 to 1.0. Other hardeners, such as the acid anhydrides, can also be employed but the polyfunctional amines are generally preferred.

Filler materials, such as lithopone, certain diatomaceous clays, powdered silicates, including lead silicate, and the like of from preferably 325 to 500 mesh size are useful in giving the proper consistency to the formulation.

Relatively large amounts of very abrasive material, including the silica carbides generally, more specifically silicon carbide and boron carbide, impart excellent abrasion resistance to the resin surface integrally bonded to the granite base. Amounts of from between about 20 and 60 or more percent by weight of the finished resin formulation have been successfully used. Abrasives having mesh sizes from 300 to 600 are very satisfactory. Additional abrasives such as diamond dust and garnet materials can be used. Carborundum types of silicate-carbon systems, such as "carbate" and certain precipitated silicas and complex silicates with pronounced silica composition are also operative.

If desired, a hydrophilic bulking material, such as aerogel or one of the recently developed bentones, may be employed to control the consistency of the formulation and to keep the abrasive particles from settling in the formulation immediately prior to use or during the curing operation. If the filler employed is sufficiently hydrophilic or has sufficiently small particle size, the bulking material may not be required. In any event, the precise amount of the bulking agent will vary with the "swelling" ability of the hydrophilic material selected, between about one and about five percent by weight being employed when the abrasive material is boron carbide, for example.

The resin surface of the finished granite based surface plate of the present invention was subjected to comparative abrasion tests with steel and aluminum plates. A standardized testing procedure was used wherein the percentage of material worn off in a given period of time was determined, the following data being obtained.

Resin faced granite surface plate  0.008 percent of material worn off in unit time.
Hot roll steel_____ 0.106 percent of material worn off in unit time.
Aluminum_____ 0.278 percent of material worn off in unit time.

These results indicate that the resin surface was about thirteen times as abrasion resistant as the hot roll steel and about thirty times as resistant as the aluminum sheet under the standard test conditions employed. It is known that the hot roll steel possesses greater abrasion resistance than granite per se. The very superior abrasion resistance of the resin faced granite based surface plate over the conventional metal or granite surface plate per se can be attributed to the novel resin formulation, as illustrated in Example 1, wherein relatively large amounts of highly abrasive materials are included.

OPERATION

In operation, resin faced granite backed surface plates co-ordinate accuracy in tool making operations within limits not heretofore available in surface plates of other material where thermal and moisture variations are encountered. Since the surface accuracy of a surface plate is related directly to its smoothness of surface and its faithful reproduction of planal surface, accuracy checks of surface plates produced by the accompanying methods have shown surface variations not in excess of .0015 inch and planal variations of not in excess of .0030 inch in surface plates having a square size approximately 6 feet by 6 feet. In plates of this size the thickness of granite averaged between three and four inches. The thickness of the resin face has been varied considerably from between about 1/16 of an inch and about 1/2 inch or more without any material difficulty. Where the granite face is more or less irregular the variations of surface up to 1/4 of an inch appear to have no appreciable effect upon the observed quality of the finished surface plate 20. It has been found that by elevating the temperatures of the granite two desirable effects are obtained. Cross-section studies indicate the complete elimination of air bubbles and a more rapid cure of the resin is brought about. Variations brought about by thermal variations after curing are noted elsewhere in this specification.

When it becomes necessary to refinish a surface plate prepared in accord with this invention the surface plate 20 need only be solvent cleaned and recast with a new resin face 18 which will integrally bond to the original or previously replaced surface. The simplicity of preparation of resin faced granite based surface plates has placed them in great demand in every industry requiring an extremely high order of tool co-ordination. The economy of production of such surface plates by reason of the procedural simplicity in their preparation has resulted in great tooling cost reductions. The faithfulness of reproduction and the unusual durability of such resin faced granite based surface plates has assured their demand. The restoration available for worn surfaces has avoided obsolescence on wear.

This application is a continuation-in-part of U. S. application Serial 331,255 filed 1953 January 14 wherein disclosure is made of the use of abrasive materials and of U. S. application Serial 404,013 filed 1954 January 14.

Having described a specific embodiment of the invention, I claim:

1. In a surface plate, a base comprising a natural stone characterized by a low coefficient of thermal expansion and high dimensional stability, said base having an upper surface in general conformity with a reference surface to be reproduced, said base having bonded to said surface a coating of an epoxy resin composition comprising an epoxy resin and an active hardener agent in the ratio of about 1.0 of the resin-1.0 of the hardener agent, said coating presenting a smooth, hard and abrasion resistant top face which is an accurate reproduction of said reference surface, said epoxy resin comprising a condensation product of a chlorohydrin and a polyphenol under alkaline conditions.

2. A surface plate in accordance with claim 1, in which said chlorohydrin is epichlorohydrin and said polyphenol is bis-phenol-A.

3. A surface plate comprising a base of rigid, nonmetallic and inorganic material characterized by a low coefficient of thermal expansion and high dimensional stability, said base having an upper surface in general conformity with a reference surface to be reproduced, said base having bonded to said surface a coating of an epoxy resin composition comprising an epoxy resin and a hardener having an active hardener agent in the ratio of about 1.0 effective resin-1.0 effective hardener agent, said coating presenting a smooth, hard and abrasion resistant top face which is an accurate reproduction of said reference surface, said epoxy resin comprising a condensation product of a chlorohydrin and a polyphenol under alkaline conditions.

4. A surface plate comprising a base of natural stone characterized by a low coefficient of thermal expansion and high dimensional stability, said base having an upper surface in general conformity with a reference surface to be reproduced, said base having bonded to said surface a coating of an epoxy resin composition comprising an epoxy resin and a hardener having an active hardener agent in the ratio of about 1.0 effective resin-1.0 effective hardener agent, said coating presenting a smooth, hard and abrasion resistant top face which is an accurate reproduction of said reference surface, said epoxy resin comprising a condensation product of a chlorohydrin and a polyphenol under alkaline conditions.

5. A surface plate comprising a base of granite having an upper surface in general conformity with a reference surface to be reproduced, said base having bonded to said surface a coating of an epoxy resin composition comprising an epoxy resin and a hardener having an active hardener agent in the ratio of about 1.0 effective resin-1.0 effective hardener agent, said coating presenting a smooth, hard and abrasion resistant top face which is an accurate reproduction of said reference surface, said epoxy resin comprising a condensation product of a chlorohydrin and a polyphenol under alkaline conditions.

6. A surface plate comprising a base of natural stone characterized by a low coefficient of thermal expansion and high dimensional stability, said base having an upper surface in general conformity with a reference surface to be reproduced, said base having bonded to said surface a coating of an epoxy resin composition comprising an epoxy resin comprised of a produce of condensation under alkaline conditions of epichlorohydrin and bis-phenol-A, and a hardener having an active hardener agent in the ratio of about 1.0 effective resin-1.0 effective hardener agent, said coating presenting a smooth, hard and abrasion resistant top face which is an accurate reproduction of said reference surface.

References Cited in the file of this patent

UNITED STATES PATENTS

| | | |
|---|---|---|
| 1,450,185 | Myers | Apr. 3, 1923 |
| 1,721,367 | Barringer | July 16, 1929 |
| 2,039,141 | Brault | Apr. 28, 1936 |
| 2,193,635 | Marshall | Mar. 12, 1940 |
| 2,246,898 | Sayre | June 24, 1941 |
| 2,336,506 | Saunders | Dec. 14, 1943 |
| 2,547,087 | Milligan | Apr. 3, 1951 |
| 2,667,664 | Ferrell | Feb. 2, 1954 |
| 2,752,275 | Raskin | June 26, 1956 |

FOREIGN PATENTS

| | | |
|---|---|---|
| 551,361 | Great Britain | Feb. 18, 1943 |

OTHER REFERENCES

Concrete, pages 12 and 45, June 1949.